US012053786B2

(12) United States Patent
Backman et al.

(10) Patent No.: US 12,053,786 B2
(45) Date of Patent: Aug. 6, 2024

(54) HYDROCYCLONE WITH AN IMPROVED FLUID INJECTION MEMBER

(71) Applicant: Valmet Technologies Oy, Espoo (FI)

(72) Inventors: Jan Backman, Jarfalla (SE); Ralf Backvik, Jarfalla (SE); Roger Becker, Nashua, NH (US); Allan Carlsson, Sodertalje (SE); Valentina Kucher, Sharholmen (SE); Morgan Persson, Tyreso (SE); Felix Spegel, Stockholm (SE); Jonas Sundin, Taby (SE); Bengt Eriksson, Nashua, NH (US)

(73) Assignee: Valmet Technologies Oy, Espoo (FI)

( * ) Notice: Subject to any disclaimer, the term of this patent is extended or adjusted under 35 U.S.C. 154(b) by 0 days.

(21) Appl. No.: 18/000,068

(22) PCT Filed: Jul. 3, 2020

(86) PCT No.: PCT/US2020/040825
§ 371 (c)(1),
(2) Date: Dec. 8, 2022

(87) PCT Pub. No.: WO2022/005490
PCT Pub. Date: Jan. 6, 2022

(65) Prior Publication Data
US 2023/0211359 A1 Jul. 6, 2023

(51) Int. Cl.
*B04C 5/081* (2006.01)
*B04C 9/00* (2006.01)

(52) U.S. Cl.
CPC ........ *B04C 5/081* (2013.01); *B04C 2009/008* (2013.01)

(58) Field of Classification Search
CPC ...... D21D 5/24; B04C 5/081; B04C 2009/08; B04C 5/02; B04C 5/04; B04C 5/08; A47L 9/1608; A47L 9/165
(Continued)

(56) References Cited

U.S. PATENT DOCUMENTS 3,347,372 A 10/1967 Bouchillon
3,802,164 A * 4/1974 Bowen .................. B01D 45/12 110/244
(Continued)

FOREIGN PATENT DOCUMENTS

CA 2465722 A1 10/2005
GB 607777 9/1948
GB 712792 A 7/1954

*Primary Examiner* — Michael McCullough
*Assistant Examiner* — Jessica L Burkman
(74) *Attorney, Agent, or Firm* — James Earl Lowe, Jr.

(57) ABSTRACT

A hydrocyclone having a mid-section having a longitudinal axis and a radius, and a fluid injection member releasably connected to the mid-section. The fluid injection member has a dilution passage therethrough and two spaced apart dilution ports, at least one dilution port being at an angle between 15 and 75 degrees relative to the mid-section radius. The injection member comprises a nozzle housing releasably connected to the mid-section, the nozzle housing having a dilution passage therethrough, and a nozzle adapted to be connected to the nozzle housing, the nozzle being planar and having at least one dilution port therethrough, the nozzle being receivable within the dilution passage.

20 Claims, 7 Drawing Sheets

(58) Field of Classification Search
USPC .......................................................... 209/725
See application file for complete search history.

(56) References Cited

U.S. PATENT DOCUMENTS

| | | | | |
|---|---|---|---|---|
| 3,960,734 | A | 6/1976 | Zagorski | |
| 3,992,172 | A | 11/1976 | Clark | |
| 4,260,480 | A | 4/1981 | Lewis et al. | |
| 4,662,909 | A | 5/1987 | Durr | |
| 4,696,737 | A * | 9/1987 | Bouchillon ............... | B04C 5/18<br>210/512.1 |
| 5,240,115 | A | 8/1993 | Crossley et al. | |
| 5,879,422 | A | 3/1999 | Brottgardh et al. | |
| 6,109,451 | A | 8/2000 | Grimes | |
| 9,821,252 | B2 | 11/2017 | Lammens et al. | |
| 2009/0032457 | A1 | 2/2009 | Castro Soto | |
| 2017/0284182 | A1 | 10/2017 | Hopper | |
| 2017/0312764 | A1 * | 11/2017 | Robert ...................... | B04C 5/04 |
| 2020/0122163 | A1 * | 4/2020 | Knorr ....................... | B04C 5/24 |

* cited by examiner

HYDROCYCLONE WITH AN IMPROVED FLUID INJECTION MEMBER

BACKGROUND

The present disclosure relates to a hydrocyclone for separating a fiber pulp suspension containing relatively heavy contaminants.

Hydrocyclones are used in the pulp and paper making industry for cleaning fiber pulp suspensions from contaminants, in particular, but not exclusively, from contaminants that differ from fibers in density.

BRIEF SUMMARY

Disclosed is a hydrocyclone having a mid-section having a longitudinal axis and a radius, and a fluid injection member having at least one dilution port therethrough, the dilution port causing fluid to enter with both tangential and radial velocity components In one embodiment, the hydrocyclone has a mid-section having a longitudinal axis and a radius, and a fluid injection member releasably connected to the mid-section. The fluid injection member has a dilution passage therethrough and at least one spaced apart dilution ports, at least one dilution port being at an angle of between 5 and 75 degrees relative to the mid-section radius. The injection member comprises a nozzle housing releasably connected to the mid-section, the nozzle housing having a dilution passage therethrough, and a nozzle adapted to be connected to the nozzle housing, the nozzle being planar and having at least one dilution port therethrough, the nozzle being receivable within the dilution passage.

In one embodiment, one dilution port injects fluid into the mid-section in one direction and another dilution port injects fluid into the mid-section in a different direction.

Figure 1:
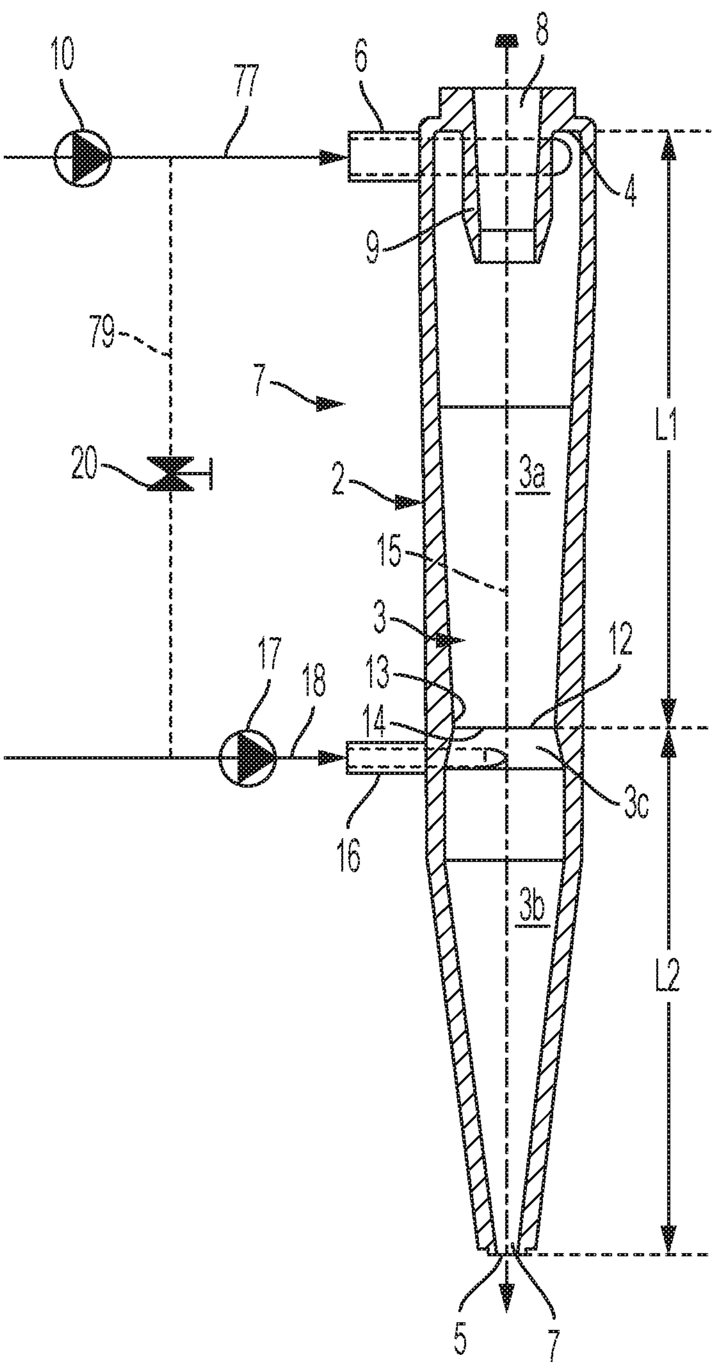
FIG. 1 Prior Art
FIG. 1 is a schematic cross-sectional view of an embodiment of a hydrocyclone according to US Kucher et al. U.S. Pat. No. 7,404,492 issued Jul. 29, 2008.
Figure 2:
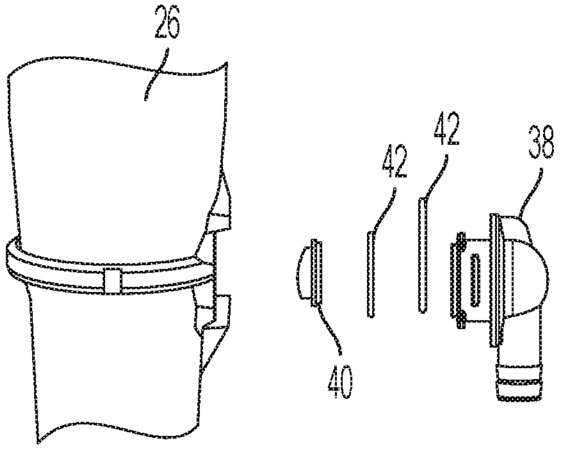
FIG. 2 is an exploded side perspective view of an improved fluid injection member comprising a nozzle releasably connected to a nozzle housing releasably connected to a mid-section of a hydrocyclone.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DETAILED DESCRIPTION

Conventional Hydrocyclone

Referring to the drawing Figures, like reference numerals designate identical or corresponding elements throughout the several Figures.

FIG. 1 shows a conventional hydrocyclone 1 which comprises a housing 2 that forms an elongate generally tapering separation chamber 3 with a base end 4 and an apex end 5. An inlet member 6 is provided on the housing 2 and is designed to feed a fiber suspension to be separated tangentially into the separation chamber 3 at the base end 4 thereof. There is a reject fraction outlet 7 at the apex end 5 of the separation chamber 3 for discharging a created reject fraction of the suspension and a central accept fraction outlet 8, defined by a conventional vortex finder 9, at the base end 4 of the separation chamber 3 for discharging a created central fraction of the suspension.

In operation, a pump 10 pumps a fiber suspension containing heavy contaminants through a conduit 11 to the inlet member 6, which feeds the suspension tangentially into the separation chamber 3. The incoming suspension forms a vortex, in which the heavy contaminants are pulled by centrifugal forces radially outwardly and the fibers are pushed by drag forces radially inwardly. As a result, a central fraction of the suspension substantially containing fibers is created centrally in the vortex and a reject fraction containing heavy contaminants and some fibers is created radially outwardly in the separation chamber. The created reject fraction is discharged through the reject fraction outlet 7 and the created central fraction is discharged through the central accept fraction outlet 8.

The housing 2 forms a first elongate generally tapering chamber section 3*a* of the separation chamber 3 extending from the base end 4 of the separation chamber 3 to an apex end 12 of the first chamber section 3*a* having an axial opening 13 and a second elongate generally tapering chamber mid-section 3*b* of the separation chamber 3 extending from a base end 14 thereof to the apex end 5 of the separation chamber 3. The axial opening 13 of the apex end 12 of the first chamber section 3*a* also forms an opening to the second chamber section 3*b* at the base end 14 thereof. The first and second chamber sections 3*a*, 3*b* are aligned with each other, so that their central symmetry axes form a common central symmetry axis 15. The vortex formed in the separation chamber 3 during operation extends from the first chamber section 3*a* through the axial opening 13 of the apex end 12 of the first chamber section 3*a* into the second chamber section 3*b*.

An injection member 16 is provided on the housing 2 to inject a liquid tangentially into the separation chamber 3 at a distance from the apex end 5 of the separation chamber 3, which is at least 40% of the length of the separation chamber 3. In the embodiment of FIG. 1 the second chamber section 3*b* includes an injection passage 3*c* at the base end 14 of the second chamber section 3*b* for receiving the liquid injected by the injection member 16. The injection fluid amount is preferably equal to about 10% to 20% of the fluid at the hydrocyclone inlet, and about 15% in the illustrated embodiment.

The fluid injection member may inject a liquid, or a mixture of liquid and gas. An advantage of injecting a mixture of liquid and gas is that the gas mechanically dissolves fiber network occurring in the second chamber section. Advantageously, the injected fluid may be a fiber suspension having a fiber concentration lower than that of the fiber suspension to be fed by the inlet member.

In operation, a pump 17 pumps liquid through a conduit 18 to the injection member 16, which injects the liquid tangentially into the second chamber section 3*b* so that the injected liquid increases the rotational speed of a portion of the vortex in the chamber section 3*b*, thereby increasing the separation efficiency with respect to fibers existing in said vortex portion. As indicated in a broken line 19 in FIG. 1, a part flow of the fiber suspension conducted through the conduit 11 may optionally be directed via an adjustable valve 20 to the conduit 18.

In one embodiment, the length L1 of the first chamber section 3*a* is about 60 cm and the length L2 of the second chamber section is about 50 cm. The width of the second chamber section 3*b* measured where the liquid is injected is about 6 cm and the width of the first chamber section 3*a* where the suspension is fed is about 8 cm.

Generally, the length L1 of the first chamber section 3*a* should be 5 to 9 times the width of the first chamber section 3*a* also measured where the suspension is fed into the first chamber section. The width of the second chamber section 3*b* measured where the liquid is injected should be equal to or smaller than the width of the first chamber section, preferably 65 to 100% of the width of the first chamber section, measured where the suspension is fed into the first chamber section. The width of the first chamber section at the apex should be 50 to 75% of the width of the first chamber section measured where the suspension is fed into the first chamber section.

Improved Fluid Injection Member

Illustrated in FIGS. 2-5 is an improved hydrocyclone 26 having an improved mid-section 29 with a two-shell construction, the mid-section 29 having a longitudinal axis 15 and a radius. This embodiment 26 of the hydrocyclone and the prior art construction 1 shown in FIG. 1 have most elements in common other than the fluid injection member 16.

Illustrated in FIGS. 2-12C is an improved fluid injection member 28 for the hydrocyclone of FIGS. 2-5, the fluid injection member 28 being adapted to be releasably connected to the mid-section 30 of the hydrocyclone. The mid-section 29 of the hydrocyclone as used herein means a portion of the hydrocyclone 26 between the base end 4 and the apex end 5 of the hydrocyclone. The improved hydrocyclone 26 also has a safety plug 33 extending through the outer shell 23 of the mid-section 29.

Figure 4:
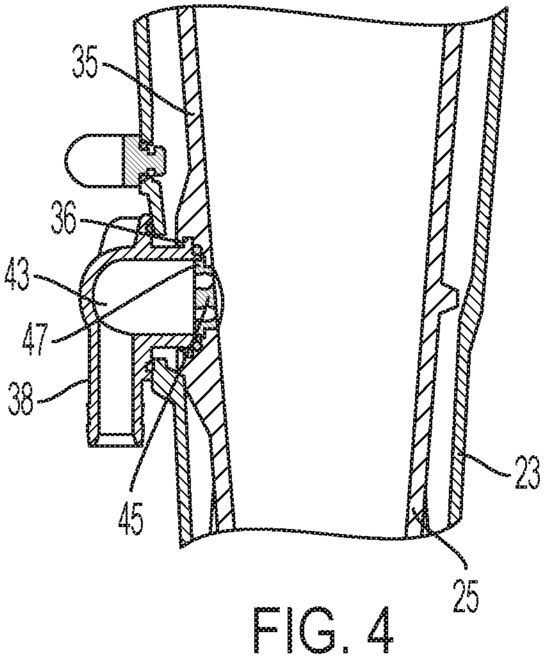
FIG. 4 is a cross sectional view of the improved fluid injection member attached to the mid-section of the hydrocyclone.

The mid-section 29 comprises an outer shell 23 and an inner shell 25 spaced apart from the outer shell 23, as shown in FIG. 4. The two shells act together to provide a strong structural component of the hydrocyclone 26. Further, the two shells provide a safer hydrocyclone for if the inner shell might be broken, the outer shell provides an additional layer of security. The two sheets also allow for the outer shell to be stronger while the inner shell can be elastic with higher chemical and wear resistance, for example. The fluid injection member 28 is adapted to be releasably connected to the mid-section 29 and serves to connect together the outer shell 23 and inner shell 25. This secure connection between the outer shell and inner shell allows for the shells to be thinner than if the shells were not so connected. More particularly, the injection member 28 is adapted to be connected to the mid-section 29 with a double twist, bayonet style, locking engagement. The bayonet style connection is in the form of outwardly extending flanges 36 (see FIG. 7) on a nozzle housing 38 that interweave with corresponding flanges 39 in an opening 41 in the mid-section 29 (see FIG. 8), with twisting of the nozzle housing 38 relative to the mid-section 29 resulting in the nozzle housing flanges 36 being secured behind the mid-section flanges 39, as shown in FIG. 4. Various O-ring seals 42 assist in assuring a fluid tight connection.

Figure 3:
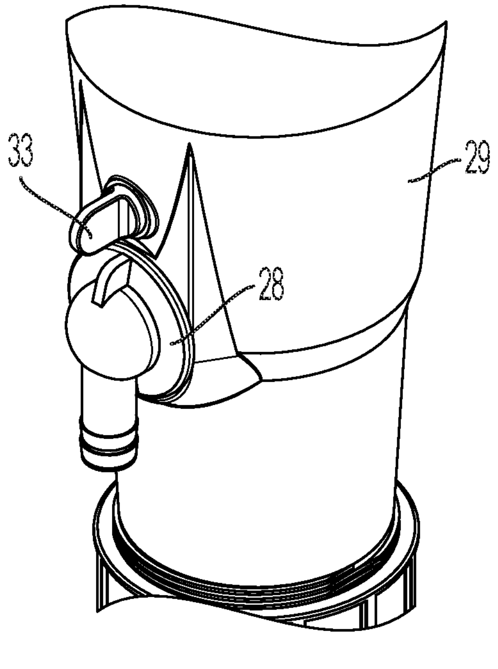
FIG. 3 is a side perspective view of the improved fluid injection member attached to the mid-section of the hydrocyclone.
Figure 5:
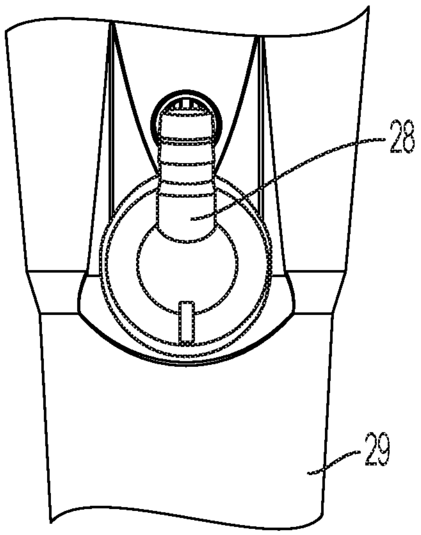
FIG. 5 is the side view of the fluid injection number in position to be attached to the mid-section.

More particularly, the nozzle housing 38 is positioned prior to engaging the mid-section 29 with the nozzle housing 38 extending upwardly, as shown in FIG. 5, and then the nozzle housing 38 is rotated to where it extends downwardly, as shown in FIG. 3, in order to engage the bayonet style connection. In the illustrated embodiment the nozzle housing 38 has an elbow shape to allow the injection member 28 to be located compactly against the mid-section 29, but in other embodiments (not shown), the nozzle housing 38 can extend along the radius of the mid-section 29 or at some other angle. In other embodiments (not shown), the nozzle housing 38 once secured to the mid-section can extend in any desired direction.

Figure 6:
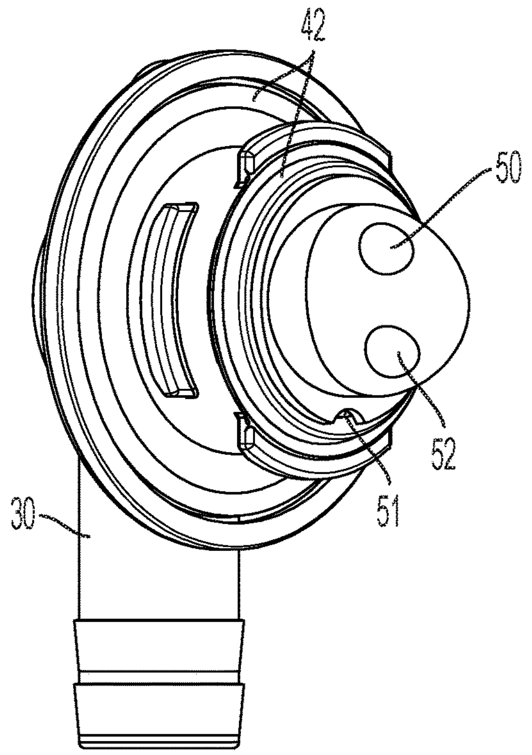
FIG. 6 is a left-side perspective view of the fluid injection member.
Figure 7:
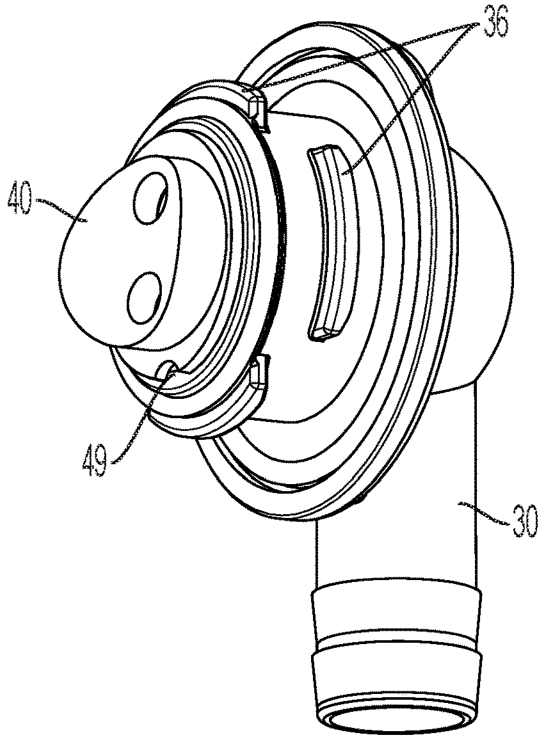
FIG. 7 is a right-side perspective view of the fluid injection member.
Figure 8:
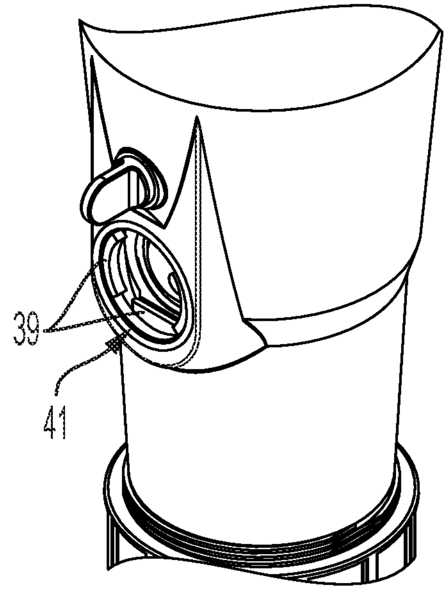
FIG. 8 is a view similar to FIG. 3 only with the nozzle housing removed.
Figure 9:
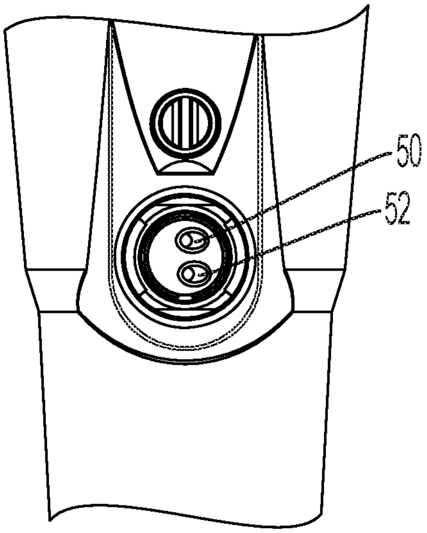
FIG. 9 is a view similar to FIG. 5 only with the nozzle housing removed, illustrating the orientation of the nozzle dilution ports relative to the mid-section.
Figure 10:
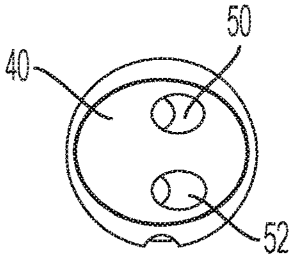
FIG. 10 is a rear view of the nozzle of the fluid injection member having two spaced apart dilution ports extending in the same direction.
Figure 11:
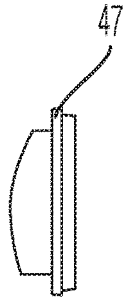
FIG. 11 is a side view of the nozzle of FIG. 10.
Figure 12:
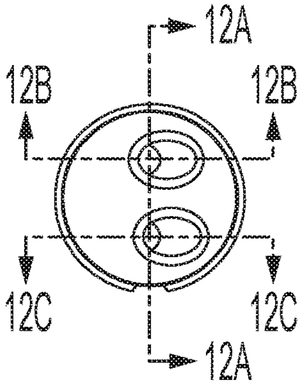
FIG. 12 is a front view of the nozzle of FIG. 10.
Figure 12A:
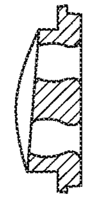
FIG. 12A is a cross sectional view of the nozzle of FIG. 12 taken along the line A-A of FIG. 12.
Figure 12B:
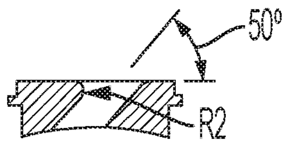
FIG. 12B is a cross sectional view of the nozzle of FIG. 12 taken along the line B-B of FIG. 12.
Figure 12C:
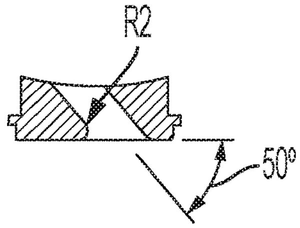
FIG. 12C is a cross sectional view of the nozzle of FIG. 12 taken along the line C-C of FIG. 12.

In the illustrated embodiment the fluid injection member 28 comprises the nozzle housing 38 releasably connected to the mid-section 29, the nozzle housing having a dilution passage 43 therethrough, as shown in FIG. 4, and a nozzle 40 adapted to be connected to the nozzle housing 38. The nozzle 40 is generally planar, as shown in FIGS. 4, 11 and 12A, but it can be convex, concave or some other shape in other embodiments (not shown). In the illustrated embodiment the nozzle 40 is positioned in the dilution passage 43 and an inner portion 45 of the nozzle 40 extends through the opening 41 in the mid-section 29. The nozzle 40 is secured between the nozzle housing 30 and the mid-section 29 by nozzle radially extending flanges 47, as shown in FIGS. 4 and 11. A tab 49 in the mid-section opening 41 aligns with a notch 51 on the nozzle 40 so the orientation of the nozzle 40 relative to the nozzle housing 38 is fixed, as shown in FIGS. 6 and 7. Although the nozzle 40 and nozzle housing 38 are formed from two separate components, in other embodiments (not shown), the fluid injection member 28 can be formed as a single piece.

Figure 15:
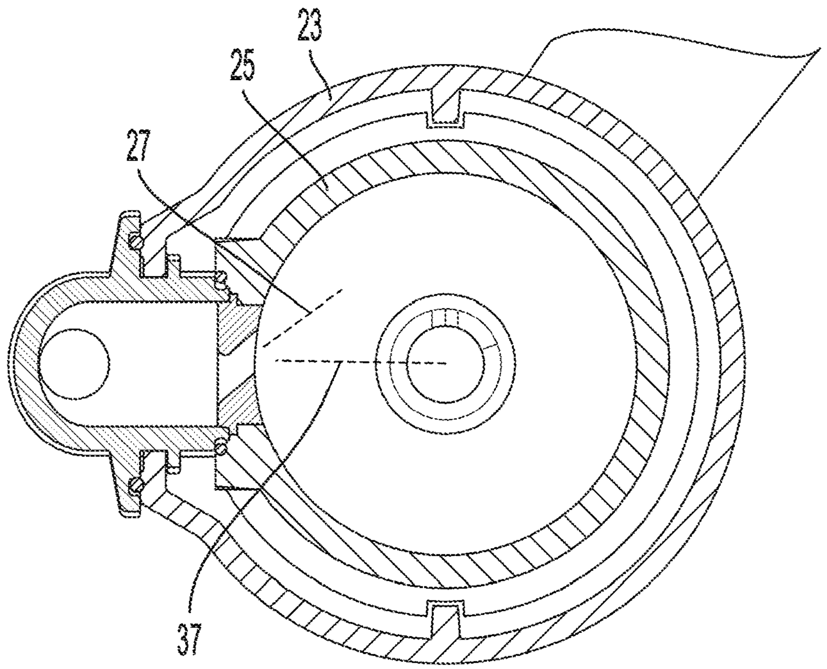
FIG. 15 is a cross sectional view perpendicular to the hydrocyclone longitudinal axis and through the nozzle dilution port.

In one embodiment, the nozzle 40 has the at least one dilution port 50 through the nozzle 40, the dilution port 40 being at an angle 27 (see FIG. 15) of between 5 and 75 degrees relative to the mid-section radius 37, and most preferable about 48 degrees, as shown in FIG. 15. In other words, the fluid from the dilution port 50 enters the mid-section with both tangential and radial velocity. In other less preferred embodiments (not shown), the dilution port can be directed along the mid-section radius 37 or only in a tangential direction. In the illustrated embodiment, the dilution port 50 is both at an angle relative to the mid-section radius and perpendicular to the mid-section longitudinal axis 15.

More particularly, in the illustrated embodiment, the injection member 28 has two spaced apart dilution ports 50 and 52 through the injection member 28 in the form of angled openings 50 and 52 in the nozzle 40. In other embodiments (not shown), there can be a single dilution port through the nozzle 40. In the illustrated embodiments, the dilution ports 50 and 52 are cylindrical, but in other embodiments (not shown), other port shapes can be used, such as slots, squares, diamonds, and so on. Further, in the illustrated embodiment the open area of each nozzle port is between 10 and 500 square millimeters, preferably between 10 and 300 square millimeters, and most preferably between 10 and 200 square millimeters. The open area is the area of the port when a cross section is taken through the port perpendicular to the longitudinal axis of the port. In a preferred embodiment, the total relative open area of the nozzle ports divided by the cross-sectional area of the inner shell where the nozzle port is located is between 0.1 and 10 percent.

In the illustrated embodiment, the injection member 28 is located at least at position about 30% of total length of chamber up from apex 5, and preferable greater than 40% up. In other embodiments (now shown), other positions can be used. The injection fluid amount from a nozzle port totals about 2% to 10% of the fluid at the hydrocyclone inlet, and preferably about 5% in the illustrated embodiment. With additional nozzle ports, higher injection fluid amounts are possible. In other embodiments (not shown) the hydrocyclone can include additional fluid injection members spaced apart around the hydrocyclone periphery or along the hydrocyclone axis 15.

The nozzle 40 is adapted to be attached to the nozzle housing 38 so that the injection direction of the dilutions ports 50 and 52 is in a direction perpendicular to the longitudinal axis 15 of the hydrocyclone 26. This results in the injection fluid entering the mid-section 29 oriented circumstantially around the inside of the mid-section 29.

Figure 13A:
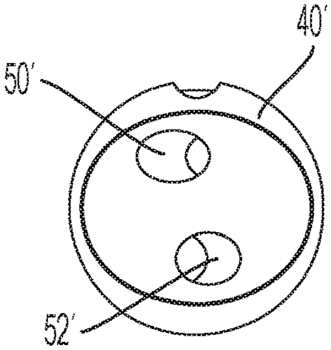
FIG. 13A is a rear view and FIG. 13B is a front view of another embodiment of a nozzle having two spaced apart dilution ports with one port extending in one direction and another port extending in an opposite but parallel direction.
Figure 13B:
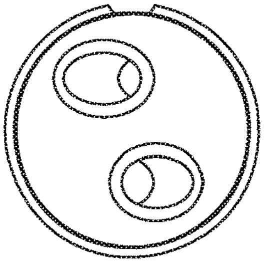

Illustrated in FIG. 13A and FIG. 13B is another embodiment of a nozzle 40' having two spaced apart dilution ports 50' and 52', with one port 50' extending in one direction and another port 52' extending in an opposite but parallel direction.

Figure 14A:
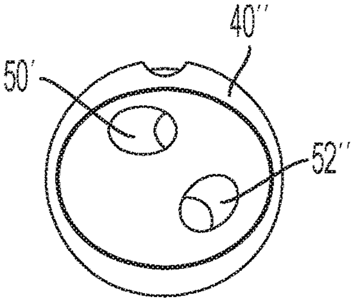
FIG. 14A is a rear view and FIG. 14B is a front view of yet another embodiment of a nozzle having two spaced apart dilution ports with one port extending in one direction and another port extending in an opposite direction at an angle relative to the port extending in the one direction.
Figure 14B:
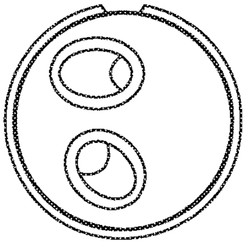
Figure 16:
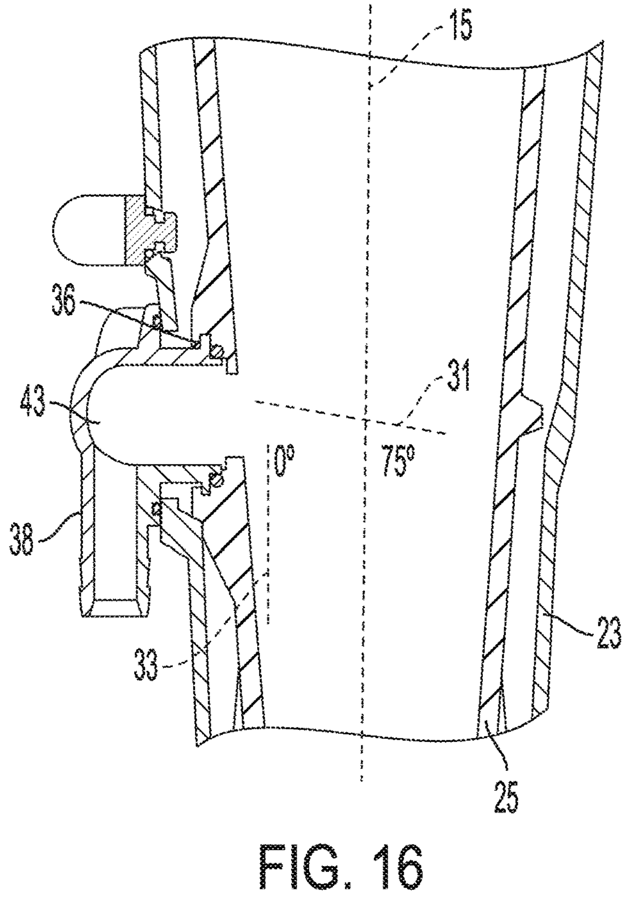
FIG. 16 is a cross sectional view of a portion of the hydrocyclone along the hydrocyclone longitudinal axis with the nozzle removed.

In still another embodiment of the nozzle 40", as shown in FIGS. 14A and 14B, a dilution port 50" is at an angle of between 15 and 75 degrees relative to the mid-section radius and not perpendicular to the mid-section longitudinal axis 15, while another dilution nozzle port 52" is at an angle relative to the mid-section longitudinal axis 15 and toward the apex end 5 of between 0 (see line 33 in FIG. 16) and 75 degrees (see line 31 in FIG. 16). In this alternate embodiment, the one dilution port 50" aids circular motion of the fluid in the hydrocyclone while the other dilution port 52" is at an angle towards the apex end 5 of the hydrocyclone and aids in movement of the fluid down the hydrocyclone. In other embodiments (not shown), the two spaced apart dilution ports can be oriented in still other directions.

The improved fluid injection member 28 of this disclosure provides greater flexibility to allow for injection of fluid into the hydrocyclone in different directions. The improved fluid injection member 28 with two spaced apart dilution ports allow for fluid injection into the hydrocyclone in more than one direction, and the two dilution ports help ensure fluid injection if one port gets clogged. The planar nozzle 40 allows for a dilution port selection to be made at the hydrocyclone depending on what materials are being separated in the hydrocyclone, thus allowing more ready tuning of the injection member 28 to the particular hydrocyclone needs. The bayonet style connection allows for a secure and quick connection of the fluid injection member 28 to the mid-section 29.

Various other features and advantages of the disclosure will be apparent from the following claims.

The invention claimed is:

1. A hydrocyclone having a base end and an apex end and a single separation chamber between the base end and the apex end, and a mid-section between the base end and the apex end having a longitudinal axis and a radius, the mid-section having an interior for fluid passage therethrough, and a fluid injection member in the mid-section having at least one dilution port therethrough, the dilution port being into the interior of the mid-section and causing fluid to enter a tapering interior of the mid-section with both tangential and radial velocity components.

2. The hydrocyclone according to claim 1 wherein the mid-section comprises two spaced apart shells, and the fluid injection member is adapted to be connected to both of the shells.

3. The hydrocyclone according to claim 1 wherein the at least one dilution port is at an angle towards the apex end of the hydrocyclone.

4. The hydrocyclone according to claim 1 wherein the fluid injection member is adapted to be releasably connected to the mid-section.

5. A hydrocyclone having a base end and an apex end and a single separation chamber between the base end and the apex end, and a mid-section between the base end and the apex end having a tapering interior for fluid passage therethrough, a fluid injection member connected to the mid-section, the fluid injection member having a dilution passage therethrough, and at least one dilution port therethrough, the dilution port being into the tapering interior of the mid-section and causing fluid to enter the interior of the mid-section at an angle of between 5 and 75 degrees relative to the mid-section radius.

6. The hydrocyclone according to claim 5 wherein the fluid injection member comprises a nozzle housing connected to the mid-section, and at least one nozzle adapted to be connected to the nozzle housing.

7. The hydrocyclone according to claim 5 wherein the at least one dilution port is at an angle towards the apex end of the hydrocyclone.

8. The hydrocyclone according to claim 5 wherein the injection member is located at least 30% up the total length of a hydrocyclone from a hydrocyclone apex end.

9. The hydrocyclone according to claim 5 the dilution port being at an angle toward the apex end relative to the mid-section longitudinal axis of between 0 and 75 degrees.

10. A hydrocyclone having a base end and an apex end and a single separation chamber between the base end and the apex end, and a mid-section between the base end and the apex end having an interior for fluid passage therethrough, a fluid injection member adapted to be connected to the mid-section, the injection member having at least two spaced apart dilution ports into the interior of the mid-section and causing fluid to enter the interior of the mid-section.

11. The hydrocyclone according to claim 10 wherein one dilution port injects fluid into the mid-section in one direction and another dilution port injects fluid into the mid-section in a different direction.

12. The hydrocyclone according to claim 10 wherein the dilution port is at an angle of between 0 and 75 degrees from the hydrocyclone longitudinal axis towards the apex end of the hydrocyclone.

13. The hydrocyclone according to claim 10 wherein the mid-section comprises two spaced apart shells, and the fluid injection member is adapted to be connected to both of the shells.

14. The hydrocyclone according to claim 10 wherein the dilution ports are at an angle relative to the mid-section radius.

15. The hydrocyclone according to claim 10 wherein the injection member is located at least 30% up a total length of the hydrocyclone from a hydrocyclone apex end.

16. The hydrocyclone according to claim 10 wherein one dilution port is at one angle relative to the mid-section radius and another dilution port is at another angle relative to the mid-section radius.

17. The hydrocyclone according to claim 10 wherein one dilution port is at one angle relative to the mid-section longitudinal axis and another dilution port is at another angle relative to the mid-section longitudinal axis.

18. The hydrocyclone according to claim 10 wherein the fluid injection member is adapted to be releasably connected to the mid-section.

19. The hydrocyclone according to claim 10 wherein a nozzle is adapted to be attached to a nozzle housing so that the injection direction of both of the dilutions ports is in a direction perpendicular to the longitudinal axis of the hydrocyclone.

20. The hydrocyclone according to claim 19 wherein the nozzle has at least one dilution port through the nozzle, the dilution port being at an angle relative to the mid-section radius and not perpendicular to the mid-section longitudinal axis.

* * * * *